March 17, 1959 C. S. CODY 2,877,839
FUEL SUPPLY APPARATUS FOR INTERNAL COMBUSTION ENGINE
Filed Nov. 10, 1953
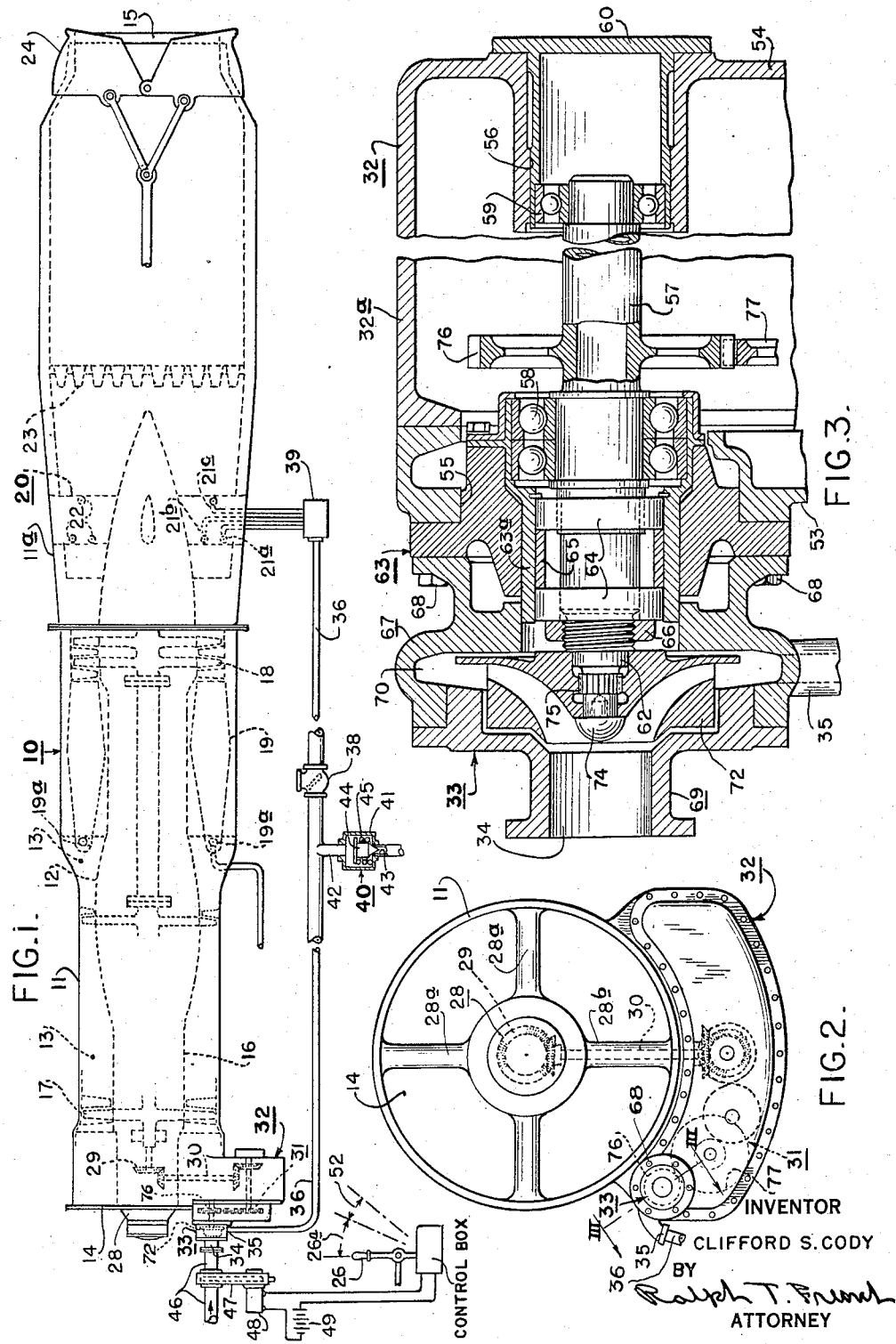
INVENTOR
CLIFFORD S. CODY
BY
Ralph T. French
ATTORNEY

United States Patent Office 2,877,839
Patented Mar. 17, 1959

2,877,839

FUEL SUPPLY APPARATUS FOR INTERNAL COMBUSTION ENGINE

Clifford S. Cody, Lima, Pa., assignor to Westinghouse Electric Corporation, East Pittsburgh, Pa., a corporation of Pennsylvania Application November 10, 1953, Serial No. 391,249

2 Claims. (Cl. 158—36.4)

This invention relates to a fuel supply system for an internal combustion engine, more particularly to a fuel supply system for an aviation turbojet engine.

Aviation turbojet engines are often provided with afterburners which include fuel combustion apparatus disposed downstream of the turbine and operated for short periods of time when it is desired to augment the thrust of the engine in order to attain sudden bursts of thrust in excess of the normal military thrust of the engine or to assist in take-off when heavily loaded.

It is an object of the invention to provide an improved and lightweight fuel supply system for the afterburner of an aviation turbojet engine.

It is another object of the invention to provide a system of the above type in which the fuel pump is continuously driven while the engine is in operation but which is unloaded in a simple manner when the afterburner is not being operated.

It is a further object to provide a fuel pump and gear box arrangement which is readily adaptable to the above fuel supply system and which obviates a separate lubricating system for the pump shaft.

It is a still further object to provide an axial or centrifugal fuel pump of the first order of reliability by providing positive lubrication for all of its rubbing parts and by eliminating rubbing parts subject to questionable lubrication.

Yet another object is to provide an axial or centrifugal type fuel pump and gear box arrangement for an aviation engine which requires less parts, is lighter in weight, less expensive to manufacture and takes up less space on the engine than those previously utilized.

These and other objects are effected by the invention as will be apparent from the following description taken in connection with the accompanying drawings, forming a part of this application, in which:

Fig. 1 is a side elevation of a typical aviation turbojet incorporating the invention;

Fig. 2 is a frontal view of the apparatus shown in Fig. 1; and

Fig. 3 is a sectional view, on a greatly enlarged scale, taken on line III—III of Fig. 2.

Referring to Fig. 1, the turbojet engine 10 shown therein comprises an outer tubular casing structure 11, 11a having mounted therein a coaxially arranged core structure indicated generally at 12, forming therebetween an annular fluid flow passage 13 which extends axially through the engine from a forwardly-disposed air inlet 14 to a rearwardly-disposed exhaust nozzle 15. Suitably journalled within the engine 10 is a rotor indicated generally by the reference character 16, the forward end of which constitutes the rotor of an axial-flow compressor 17, and the rear end of which constitutes the rotor of a turbine 18. Annular primary combustion apparatus 19 is disposed in the passage 13 between the discharge end of the compressor 17 and the inlet of the turbine 18.

In operation, air entering the compressor by way of the annular inlet 14 is compressed by the compressor 17 and delivered to the primary combustion apparatus 19, in which fuel delivered by a plurality of nozzles 19a is burned to provide, with the uncombined air, motive fluid which is expanded through the turbine 18 for driving the compressor, and finally exhausted to the atmosphere by way of the nozzle 15, in the form of a jet establishing a propulsive thrust.

In the arrangement shown, suitable afterburner apparatus 20 is provided within the casing 11a. The afterburning apparatus illustrated includes a series of annular manifolds 21a, 21b and 21c provided with a plurality of fuel nozzles 22 which admit fuel into the casing 11a, downstream of the turbine 18. Immediately downstream of the nozzles 22 there is provided flame-holding structure 23 which may be of any desired type. A variable area nozzle structure 24 may be provided to vary the area of the exhaust nozzle 15, as is well understood in the art.

When it is desired to augment the thrust of the engine, fuel is admitted into the casing 11a through the nozzles 22, by means hereinafter described. Upon ignition, the fuel herein admitted further heats and expands the motive fluid downstream of the turbine 18 thereby increasing the velocity of the fluid as it flows through the nozzle 15. It must be pointed out that the afterburner apparatus 20 is used only intermittently and then for only short periods of time, and that primarily the engine is energized by the primary combustion apparatus 19.

As indicated at 26, a manually operable throttle lever movable through a first range of travel 26a may be utilized to vary the amount of fuel flowing through the primary nozzles 19a into the primary combustion apparatus 19 to vary the thrust of the engine during normal operation. Details of such a control are not a part of this invention and have not been shown. However, the primary fuel control system may be in accordance with R. A. Neal Patent No. 2,573,724 granted November 6, 1951 and assigned to the same assignee as the present invention.

A fairing cone 28 disposed in the central portion of the inlet 14 serves to enclose the forward end of the rotor 16 to which is attached a beveled gear 29 for taking off power from the rotor for driving various engine accessories, as well known in the art. As best shown in Fig. 2, the fairing cone 28 is supported by a plurality of struts 28a and 28b. The strut 28b is of hollow form with an axial passageway, within which is disposed a driven shaft 30 provided with gears at its upper and lower ends for transmitting power from the rotor 16 to a gear train, generally indicated 31, rotatably supported within a gearbox structure, generally indicated 32. As well known in the art, the gear train 31 serves to deliver power to various accessories, such as a lubricant pump, starter apparatus, fuel governor apparatus and the like. Such accessories may also include a fuel pump, generally indicated 33, having a fuel inlet 34 and a fuel outlet 35, hereinafter described in greater detail.

In accordance with the invention, the fuel pump 33 is of the axial or centrifugal type or combination thereof and communicates at its outlet end 35 by means of a conduit 36 with the afterburner nozzles 22. A check valve 38, which may be of any conventional type in which the movable valve element is biased shut and movable to the open position by fluid pressure, is interposed in the conduit 36 upstream of an afterburner control, generally indicated 39. The afterburner control 39 is not shown in detail and need not be described, since it forms no part of the invention and may be of any desirable type serving to provide the desired fuel control to the afterburner nozzles 22.

A bleed valve 40 of any desirable type is connected in the conduit 36 intermediate the pump outlet 35 and the check valve 38. As illustrated, the bleed valve has a housing 41 provided with an inlet 42 and an outlet port 43 and a movable plug 44 biased to an open position by means of a spring 45 but movable against the bias to close the port 43, when pressure of the fuel in conduit 36 rises to a predetermined value. However, it must be understood that the bleed valve 40 may be of the servo type and controlled by movement of the throttle lever 26.

A source of fuel (not shown) is connected to the pump inlet 34 by means of a supply conduit 46 in which is interposed a gate valve 47. Although details of the gate valve 47 have not been shown, it must be understood that it is movable from a closed position to an open position to permit fuel to flow through the conduit 46 into the pump 33 when it is desired to operate the afterburner apparatus. The gate valve 47 may be of any remotely actuated type, but as shown, it is provided with an actuating motor 48 of the reversible type connected to an electric supply 49 and controlled by the throttle 26 in such a manner that when the throttle is moved into the afterburning range 52, the motor 48 is energized in valve opening direction. Conversely, when the throttle is moved into the normal operating range 26a, the motor is energized in valve closing direction.

When it is desired to augment the thrust of the engine 10 beyond the power normally attained, the afterburner fuel system may be actuated by movement of the throttle 26 into the afterburning range 52, thereby moving the gate valve 47 to the open position and allowing fuel to flow through the supply conduit 46 into the inlet of the pump 33. Since the pump is constantly operating as long as the engine is in operation, fuel will be pumped thereby through the conduit 36, building pressure therein which actuates the bleed valve 40 to its closed position and the check valve 38 to its open position. The fuel then flows through the control 39 and the afterburner nozzles 22 into the region defined by the casing 11a. The fuel issuing from the above nozzles is then ignited by suitable ignition means (not shown) and the flame anchors upon the flameholder 23. The resulting heat input into the motive gas serves to expand and accelerate the gas, so that the velocity of the jet flowing through the exhaust nozzle 15 is increased, thereby resulting in additional thrust of the engine.

When it is desired to terminate operation of the afterburner, the throttle lever 26 may be returned to any desired setting within the normal operating travel 26a. Upon such movement, the circuit through the motor 48 is reversed, reversing the direction of rotation of the motor, thereby closing the gate valve 47 and interrupting fuel flow from the supply conduit 46 into the pump 33. Upon such interruption, the pressure in the conduit 36 will subsequently fall to a low value whereupon check valve 38 will close, trapping some fuel in the conduit 36 between the inlet 34 of the pump and the check valve. The bleed valve 40 then moves to open position, permitting fuel trapped in the conduit 36 and in the pump 33 to be scavenged therefrom to the atmosphere. Since the pump is now devoid of fuel, it will operate with very low power consumption. Also, since no fuel is present in the pump, the pump will run cool obviating vapor lock upon subsequent operation of the system.

The fuel pump 33, as previously mentioned, is of the centrifugal or axial type and is mounted on the gear box 32 in such a manner that it is constantly in operative engagement with the gear train 31 connected to the rotor 16 of the engine. As shown in Fig. 3, the gear box 32 is attached to a lower portion of the casing 11 and is provided with a continuous end wall 32a and fore and aft walls 53 and 54, respectively, providing a liquid tight compartment for the gear train 31 which, in accordance with the usual practice, is flooded with oil constantly being pumped therethrough by an oil pump (not shown) for positively lubricating all the components contained in the gear box. The walls 53 and 54 of the gear box are provided with openings 55 and 56, respectively, in which a shaft 57 is rotatably supported by a pair of ball bearings 58 and 59. The aft end of the shaft terminates at the wall 54 and sealing means including a cap member 60 is provided to prevent leakage of oil from the gear box to the atmosphere. The fore end 62 of the shaft 57 extends through the wall 53 of the gear box. The wall 53 is provided with a flanged support arrangement 63 for the bearing 58 having a tubular member 63a within which is received the bearing 58 and oil sealing means, for example, a pair of oil seal rings 64, 64 spaced from each other by a spacer 65 and held in assembled relation by a nut 66.

The pump 33 is provided with a rear housing 67 which is bolted to the bearing support 63 by a series of bolts 68 and a front housing 69 attached to the rear housing 67 to provide a fluid tight seal therewith. The pump housings 67 and 69 are so formed that when joined together they form a fuel pump chamber 70 within which is disposed a centrifugal impeller 72, which may be of conventional contour. The impeller is locked to the shaft 57 by means of a cap screw 74 and to further enhance such locking the cooperating surfaces of the shaft and the impeller may be splined as indicated at 75. The shaft 57 is provided with a gear 76 which may be integral with or otherwise locked thereon and which cooperates with an adjacent gear 77 forming part of the gear train 31. Thus, it will be seen that when the engine rotor 16 is rotated, the shaft 57 and the impeller 72 carried thereby are driven by the gear train 31.

The fore portion 62 of the shaft extending beyond the sealing rings 64 is so formed that none of its surfaces rub or are guided by stationary parts outside of the gear box 32. It will also be noted that the pump impeller 72 is so formed that none of its surfaces rub on surfaces of the chamber 70 formed by the front and rear housings 69 and 67, respectively. Hence, the entire load of the shaft 57 is carried by the bearings 58 and 59 which, as heretofore described, are mounted in the walls of the gear box and are constantly lubricated by the oil in the gear box.

It will now be apparent that the invention provides a simple and compact fuel system for an afterburner of a turbojet engine utilizing a pump of the centrifugal type which is constantly driven by the rotor 16 and which, although called upon only for short amounts of time to feed fuel to the afterburner system, is so arranged that it draws power only when needed and the remainder of the time it idles in its empty chamber 70.

It will further be seen that the invention provides a novel mounting arrangement for a pump, whereby the pump shaft bearings are so arranged that they are in communication with and constantly lubricated by lubricant contained in a gear box, thereby obviating the necessity for providing separate lubricating means for the shaft. A pump of the first order of reliability is thus provided, since unlubricated rubbing parts are eliminated.

It will also be seen that with this arrangement, a lighter and more compact pump is provided. Such savings in size and weight is highly desirable in aviation engines.

While the invention has been shown in but one form, it will be obvious to those skilled in the art that it is not so limited, but is susceptible of various changes and modifications without departing from the spirit thereof.

What is claimed is:

1. In a fuel supply system for a turbojet engine, said engine having an afterburner; fuel injecting means adapted to admit fuel to said afterburner for combustion, a centrifugal fuel pump adapted to be drivenly connected to said engine, said fuel pump having a fuel inlet and a fuel outlet, a fuel supply conduit in communication with the fuel inlet of said pump, a gate valve disposed in said fuel supply conduit, said gate valve being movable from an open position to a closed position, a fuel delivery conduit connecting the fuel outlet of said pump with said fuel injecting means, a check valve disposed in said fuel delivery conduit, said check valve being biased to a closed position but movable to an open position in response to pressure of fuel in said fuel delivery conduit, and a bleed valve disposed in fluid communication with said delivery conduit intermediate said check valve and the outlet of said pump, said bleed valve having an outlet port for ejecting fuel to the atmosphere, said bleed valve being biased to a position in which said outlet port is open but movable to a position in which said outlet port is closed in response to pressure of fuel in said delivery conduit, said bleed valve outlet port being disposed below said pump outlet, whereby when said gate valve is in the closed position said check valve is moved to the closed position and said bleed valve moves to the position in which said outlet port is opened to release fuel trapped in said pump to the atmosphere.

2. In combination, a turbojet engine having an afterburner and throttle means movable from an "off" position through a portion of travel in which the afterburner is actuated, a fuel supply system including means for admitting fuel to said afterburner for combustion, a centrifugal fuel pump drivenly connected to said engine, said fuel pump having a fuel inlet and a fuel outlet, a fuel supply conduit in communication with the fuel inlet of said pump, a gate valve disposed in said supply conduit, remote control means for actuating said gate valve from a closed position to an open position, said remote control means having a member disposed in cooperative association with said throttle and engaged thereby when said throttle is moved into the afterburning range, whereby said gate valve is moved to the open position, a delivery conduit connecting the fuel outlet of said pump with said fuel admitting means, a check valve disposed in said delivery conduit, said check valve being biased to a closed position but movable to an open position in response to the pressure of fuel in said conduit, and a bleed valve connected to said delivery conduit intermediate said check valve and the outlet of said pump, said bleed valve having an outlet port communicating with the atmosphere, said bleed valve being biased to an outlet port opening position but movable to an outlet port closing position in response to pressure of fuel in said delivery conduit, said bleed valve being disposed at a point lower than said fuel pump outlet, whereby when said gate valve is moved to the closed position said check valve moves to the closed position and said bleed valve moves to the outlet port opening position, releasing fuel trapped in said pump to the atmosphere.

References Cited in the file of this patent

UNITED STATES PATENTS

| | | |
|---|---|---|
| 1,934,758 | Temple | Nov. 14, 1933 |
| 1,976,432 | Brush | Oct. 9, 1934 |
| 2,515,811 | Thrush | July 18, 1950 |
| 2,530,649 | Carey | Nov. 21, 1950 |
| 2,571,802 | Wilfley et al. | Oct. 16, 1951 |
| 2,619,162 | Feilden | Nov. 25, 1952 |
| 2,627,907 | King | Feb. 10, 1953 |
| 2,660,233 | Carey | Nov. 24, 1953 |
| 2,700,415 | Feilden et al. | Jan. 25, 1955 |
| 2,720,256 | Pearson | Oct. 11, 1955 |
| 2,740,469 | Colestock | Apr. 3, 1956 |
| 2,747,598 | Wooldrige | May 29, 1956 |